(12) United States Patent
Shukla et al.

(10) Patent No.: US 6,458,275 B1
(45) Date of Patent: Oct. 1, 2002

(54) MULTI-WELL EQUILIBRIUM DIALYSIS SYSTEM

(75) Inventors: Ashok Kumar Shukla; Mukta M Shukla; Amita M Shukla, all of Woodstock, MD (US)

(73) Assignee: Harvard Apparatus, Inc., Holliston, MA (US)

( * ) Notice: Subject to any disclaimer, the term of this patent is extended or adjusted under 35 U.S.C. 154(b) by 0 days.

(21) Appl. No.: 09/586,985

(22) Filed: Jun. 5, 2000

(51) Int. Cl.⁷ .............................................. B01D 61/28
(52) U.S. Cl. ............................ 210/321.6; 210/321.72; 210/321.75; 210/321.84; 422/99; 422/101; 422/102; 435/288.3; 435/288.4
(58) Field of Search .................. 210/321.6, 321.72, 210/321.75, 321.84; 422/101, 102, 99; 435/288.3, 288.4, 305.1, 305.2, 305.3, 305.4, 297.5; 436/809

(56) References Cited

U.S. PATENT DOCUMENTS

| | | | |
|---|---|---|---|
| 3,623,611 A | * 11/1971 | Riley et al. ............... | 210/321.6 |
| 4,450,076 A | 5/1984 | Medicus et al. | |
| 4,960,521 A | 10/1990 | Keller | |
| 4,964,961 A | 10/1990 | Brautigam | |
| 5,326,533 A | * 7/1994 | Lee et al. .................... | 422/101 |
| 5,438,128 A | 8/1995 | Nieuwkerk et al. | |
| 5,462,874 A | * 10/1995 | Wolf et al. .............. | 435/305.2 |
| 5,601,711 A | 2/1997 | Sklar et al. | |
| 5,773,238 A | * 6/1998 | Shukla ........................ | 435/41 |
| 5,833,927 A | 11/1998 | Raybuck et al. | |
| 6,200,474 B1 | 3/2001 | Kopaciewicz et al. | |

FOREIGN PATENT DOCUMENTS

EP    1088589 A2   *  4/2001

OTHER PUBLICATIONS

96—Well Dispo–Equilibrium Dialyzer at pp. 5, 18 and 19 of the AmiKa Corporation Catalog. (Undated).

* cited by examiner

*Primary Examiner*—John Kim
(74) *Attorney, Agent, or Firm*—Hale and Dorr LLP

(57) ABSTRACT

This invention relates to an equilibrium dialysis system in a multi-well format for the simultaneous preparation of multiple samples. Such an equilibrium dialysis system can be used for protein binding assays, molecule-molecule interaction studies, tissue cultures and many other biological and chemical applications. The equilibrium dialysis system described herein has at least 96 wells for the simultaneous preparation of 96 samples and can also be made in 96-well, 384-well, 1536-well or other multi-well formats.

16 Claims, 2 Drawing Sheets

MULTI-WELL EQUILIBRIUM DIALYSIS SYSTEM

FIELD OF THE INVENTION

This invention relates to an equilibrium dialysis system in a multi-well format for the simultaneous preparation of multiple samples. Such an equilibrium dialysis system can be used for protein binding assays, molecule-molecule interaction studies, tissue cultures and many other biological and chemical applications. The equilibrium dialysis system described herein has at least 96 wells for the simultaneous preparation of 96 samples and can also be made in 96-well, 384-well, 1536-well or other multi-well formats.

BACKGROUND OF THE INVENTION

The present invention relates to an equilibrium dialysis system in a multi-well format for the simultaneous preparation of multiple samples. With rapid progress in drug screening and discovery and advances in biomedical research, equilibrium dialysis is becoming an increasingly important technique for protein binding assays, molecule-molecule interaction studies, tissue cultures and many other biological and chemical applications. In a standard equilibrium dialysis system, a semi-permeable membrane is present between two sample chambers; and, assays and interaction studies are performed through the flow of molecules through said membrane. Currently, many different types of equilibrium dialyzers are available for the preparation of samples. But, the equilibrium dialyzers currently available in the market are single well or single chamber systems designed for the preparation of a single sample at any given time.

Current and developing drug. discovery and biomedical research applications, such as high throughput screening, rely on the simultaneous preparation of large numbers of samples for the rapid purification and identification of desired molecules. and samples. In such applications, hundreds or even thousands of samples often need to be prepared simultaneously using techniques such as equilibrium dialysis. Therefore, there is a need for an equilibrium dialysis system for the simultaneous preparation of large numbers of samples.

As described above, equilibrium dialysis typically consists of two chambers separated by a semi-permeable membrane and has many different applications including binding assays and interaction studies. For example, to use equilibrium dialysis to conduct a binding assay, one sample chamber is filled with a protein sample. Said protein sample consists of molecules that are too large to pass through the pores of said membrane. The second chamber is filled with small molecules that can pass through the pores of said membrane. When this system is allowed to equilibrate, said small molecules will be present in both chambers, on each side of said membrane.

If said protein molecules bind said small molecules, the state of equilibrium will be affected such that more small molecules are present in the protein sample chamber than in the small molecule sample chamber. During and upon completion of equilibrium dialysis, quantitative and qualitative assays can be performed to further study the samples. The aforementioned method is frequently used in new drug discovery methods. Equilibrium dialysis can also be used to study DNA-protein interactions, receptor binding assays and many other interactions between bio-molecules and other molecules.

In the present invention, we describe an equilibrium dialysis system in a multi-well format for the simultaneous preparation of multiple samples with applications including but not limited to high throughput screening, binding assays and bio-molecule interactions. One of the most common multi-well formats currently used is the 96-well format. The present invention describes equilibrium dialyzers in 96-well, 384-well, 1536-well and other multi-well formats.

The various features of novelty which characterize the present invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which.

DESCRIPTION OF THE PREFERRED EMBODIMENT

Figure 1:
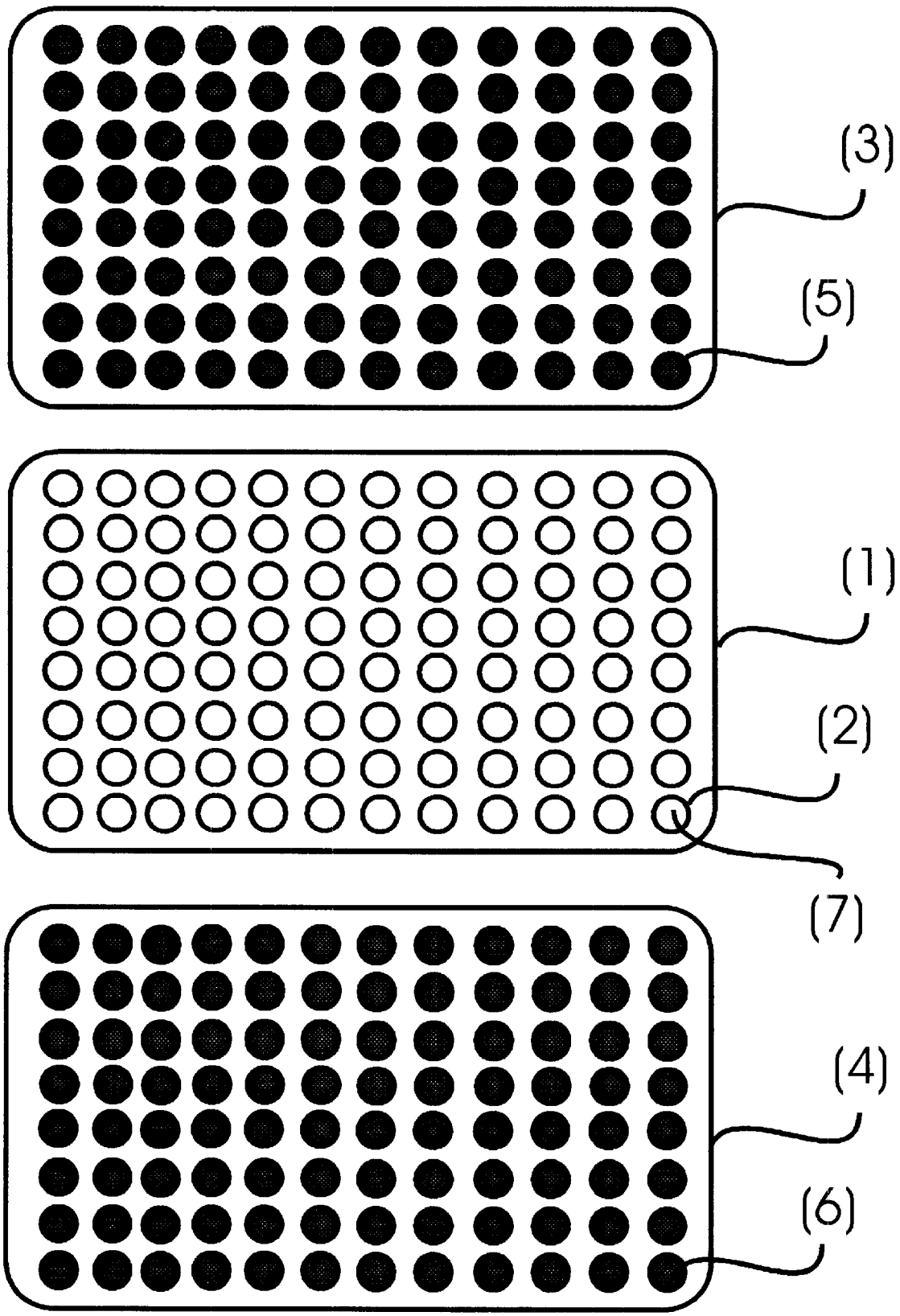
FIG. 1 is an expanded view of one embodiment of a 96-well format equilibrium dialysis system according to the present invention.
Figure 2:
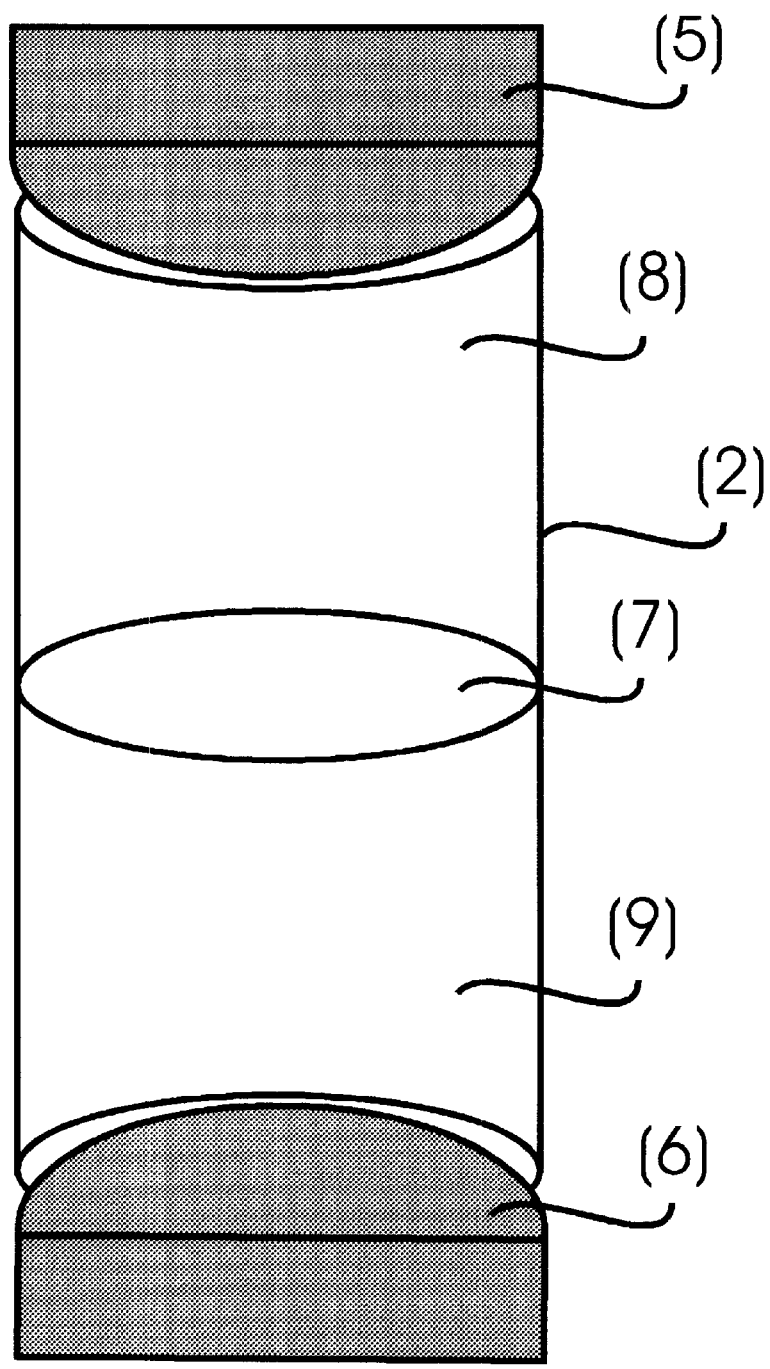
FIG. 2 is an expanded view of one embodiment of a vertical cross-section of a single well of the multi-well format equilibrium dialysis system.

Referring to the drawings, FIG. 1 is an expanded view of one embodiment of a 96-well format equilibrium dialysis system (1) according to- the present invention. The 96-well system (1) consists of 96 individual wells (2) arranged in the system. The 96-well system (1) can be made of one or more materials such as polytetrafluoroethylene, polysulfone, polyethersulfone, cellulose acetate, polystyrene, polystyrene/acrylonitrile copolymer, PVDF and glass. FIG. 1 also shows one embodiment of a top closure mat (3) and a bottom closure mat (4) consisting of 96 individual closures for the top (5) and bottom (6). The closure mats (3,4) or individual closures (5,6) can also be made of one or more materials such as polytetrafluoroethylene, polysulfone, polyethersulfone, cellulose acetate, polystyrene, polystyrene/acrylonitrile copolymer, PVDF and glass. Such closure mats are placed on top of each side of the equilibrium dialysis system (1) to cover the chambers on each side of the semi-permeable membrane (7). The equilibrium dialysis system (1) described herein can be made of any shape or size suitable for manual or automatic sample preparation and can also be made in 384-well, 1536-well or other multi-well formats. FIG. 2 is an expanded view of one embodiment of a vertical cross-section of a single well of the multi-well format equilibrium dialysis system. As shown in FIG. 2, each well (2) of the equilibrium dialysis system consists of an upper chamber (8) and a lower chamber (9) separated by a semi-permeable membrane (7). The membrane may be of any molecular weight cut-off from 100 Daltons to 10 million Daltons and may be made from one or materials from the group consisting of cellulose, cellulose acetate, teflon, polysulphone, nitrocellulose and polycarbonate. The membrane can be placed between the two said chambers by means of any physical or chemical methods including but not limited to physical placement, adhesion, bonding, chemical attachment, and heat-based sealing.

FIG. 2 also shows a vertical cross-section of the closure mat consisting of individual top (5) and bottom (6) closures for the open ends of each of the top (8) and bottom (9)

chambers respectively. The two sample chambers (8,9) can be of the same or different shapes and sizes. The two closures (5,6) can also be of the same or different shapes and sizes. Each of the closures may be part of a multi-well closure designed to close all wells of the equilibrium dialysis system simultaneously or may be part of a closure system designed to close only selected wells in the multi-well system. The closures (5,6) may also be part of an adhesive sheet, strip or layer. The closures (5,6) can also be self-sealing such that the closure will seal after the delivery of sample through the closure into the sample chamber (8,9). The samples can be placed into or removed from the chambers using a syringe, needle or other mechanism that eliminates the need to attach or remove the closures after or prior to sample placement respectively. Thus, the open ends of the chambers may also be temporarily or permanently closed ends.

Applications of the multi-well equilibrium dialysis system described herein include protein binding assays, molecule-molecule interaction studies, tissue cultures and many other biological and chemical applications. For example, in tissue culturing, small molecules, prepared by cells placed in the top chambers, can diffuse through the selective membrane into the bottom chambers, for further analysis, without any harm to the tissue cells. Furthermore, nutrients and other molecules can be introduced to the tissue cells through equilibrium dialysis. Many other interaction assays, including receptor-ligand and other protein binding assays can also be performed using the multi-well equilibrium dialysis system described by the present invention.

The broader usefulness of the invention may be illustrated by the following example.

Example #1:
Equilibrium Dialysis of Vitamin B12

The equilibrium dialysis system described in the present invention was used to perform equilibrium dialysis of a sample of Vitamin B12. 1 milligram of Vitamin B12 was dissolved in 100 milliliters of PBS buffer (phosphate buffer saline). 150 micro liters of this solution were added to each top well of a 96-well plate containing 10K Dalton molecular weight cut-off membranes. Closures were used to seal the top wells. 150 micro liters of PBS buffer were added to each bottom well of the same plate. Closures were used to seal the bottom wells. The dialysis system was rotated at 10 rpm using a rotator, for 24 hours at room temperature. Samples were collected from all the top and bottom chambers for analysis.

While a specific embodiment of the invention has been shown and described in detail to illustrate the application of the principles of the invention, it is understood that the invention may be embodied otherwise without departing from such principles and that various modifications, alternate constructions, and equivalents will occur to those skilled in the area given the benefit of this disclosure and the embodiment described herein, as defined by the appended claims.

What is claimed is:

1. An equilibrium dialysis system comprising at least 96 wells, wherein each well comprises a first chamber having an open end and a removable closure and a second chamber having an open end and a removable closure, wherein the first chamber and the second chamber are separated by a semi-permeable membrane, wherein the open end and the removable closure of the first chamber are opposite the semi-permeable membrane, and wherein the open end and the removable closure of the second chamber are opposite the semi-permeable membrane.

2. The equilibrium dialysis system of claim 1, wherein the equilibrium dialysis system comprises at least 384 wells.

3. The equilibrium dialysis system of claim 1, wherein the equilibrium dialysis system comprises at least 1,536 wells.

4. The equilibrium dialysis system of claim 1, wherein the wells are composed of one or more materials selected from a group consisting of polytetrafluoroethylene, polysulfone, polyethersulfone, cellulose acetate, polystyrene, polystyrene/acrylonitrile copolymer, PVDF and glass.

5. The equilibrium dialysis system of claim 1, wherein the semi-permeable membrane has a molecular weight cut-off of from 100 Daltons to 10 million Daltons.

6. The equilibrium dialysis system of claim 1, where the semi-permeable membrane is made of one or more materials selected from a group consisting of cellulose, cellulose acetate, polytetrafluoroethylene, polysulphone, nitrocellulose and polycarbonate.

7. The equilibrium dialysis system of claim 1, where the semi-permeable membrane is placed between the first chamber and the second chamber by physical placement, adhesion, bonding, chemical attachment, or heat-based sealing.

8. The equilibrium dialysis system of claim 1, wherein the removable closures are composed of one or more materials selected from a group consisting of polytetrafluoroethylene, polysulfone, polyethersulfone, cellulose acetate, polystyrene, polystyrene/acrylonitrile copolymer, PVDF and glass.

9. The equilibrium dialysis system of claim 1, wherein the removable closures are self-sealing closures.

10. The equilibrium dialysis system of claim 1, wherein the removable closures are part of an adhesive sheet, strip or layer.

11. The equilibrium dialysis system of claim 1, where the wells are of a shape and size suitable for manual or automatic sample preparation.

12. The equilibrium dialysis system of claim 1, where the equilibrium dialysis system is used for an application selected from protein binding assays, molecule-molecule interaction studies, tissue culturing, other biological applications, and other chemical applications.

13. The equilibrium dialysis system of claim 1, where the first chamber and the second chamber have the same size or a different size.

14. The equilibrium dialysis system of claim 1, where the first chamber and the second chamber have the same shape or a different shape.

15. The equilibrium dialysis system of claim 1, wherein the removable closures have the same size or a different size to mate with the corresponding chamber.

16. The equilibrium dialysis system of claim 1, wherein the removable closures have the same shape or a different shape to mate with the corresponding chambers.

* * * * *